Nov. 7, 1939.                E. A. LINK, JR                 2,178,637
MEANS AND METHOD OF INSTRUMENT INDICATION IN AIRPLANES, AND THE LIKE
                    Filed Aug. 3, 1935        5 Sheets-Sheet 1

INVENTOR.
EDWIN A. LINK, JR.
BY
ATTORNEY.

Nov. 7, 1939.  E. A. LINK, JR  2,178,637
MEANS AND METHOD OF INSTRUMENT INDICATION IN AIRPLANES, AND THE LIKE
Filed Aug. 3, 1935  5 Sheets-Sheet 2
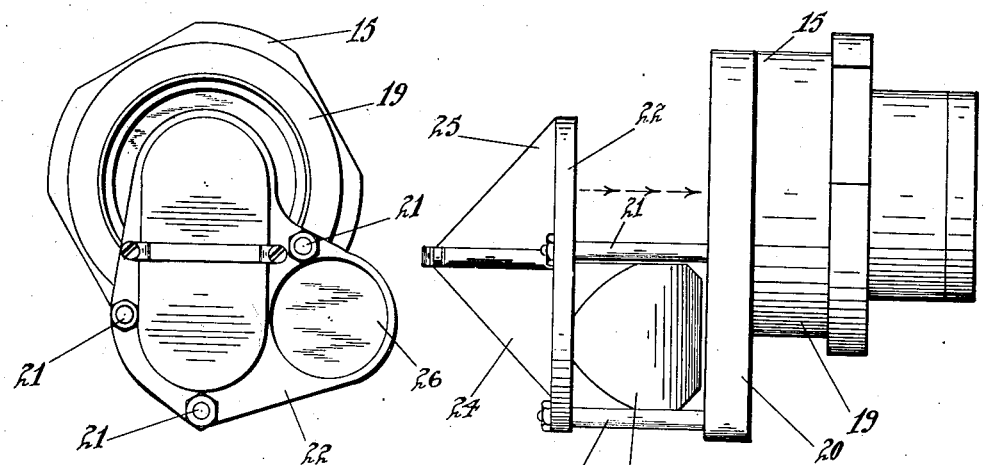
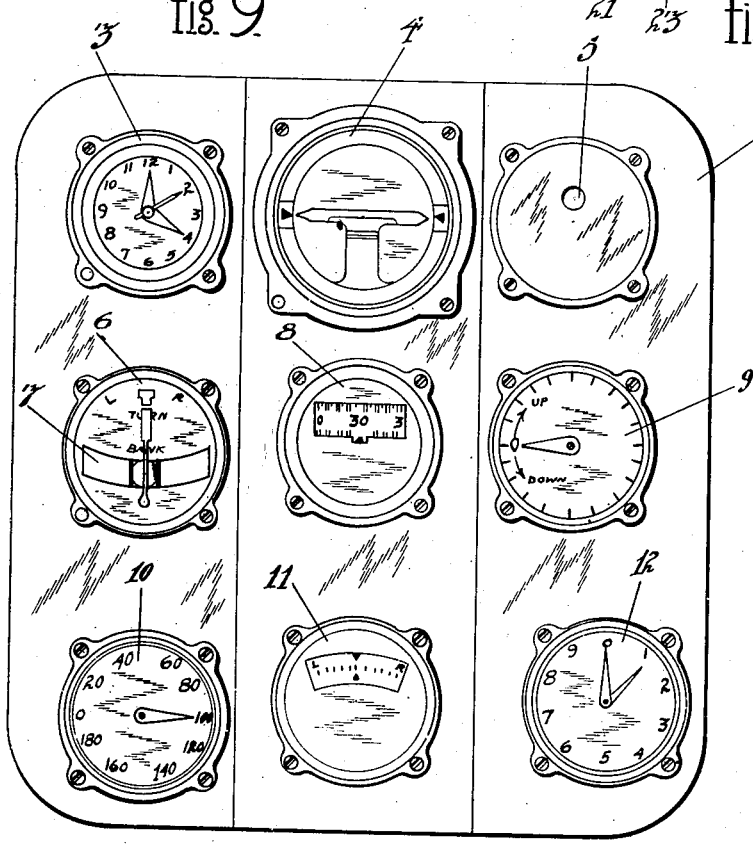
INVENTOR.
EDWIN A. LINK, JR.
BY
ATTORNEY.

Nov. 7, 1939. E. A. LINK, JR 2,178,637
MEANS AND METHOD OF INSTRUMENT INDICATION IN AIRPLANES, AND THE LIKE
Filed Aug. 3, 1935 5 Sheets-Sheet 3
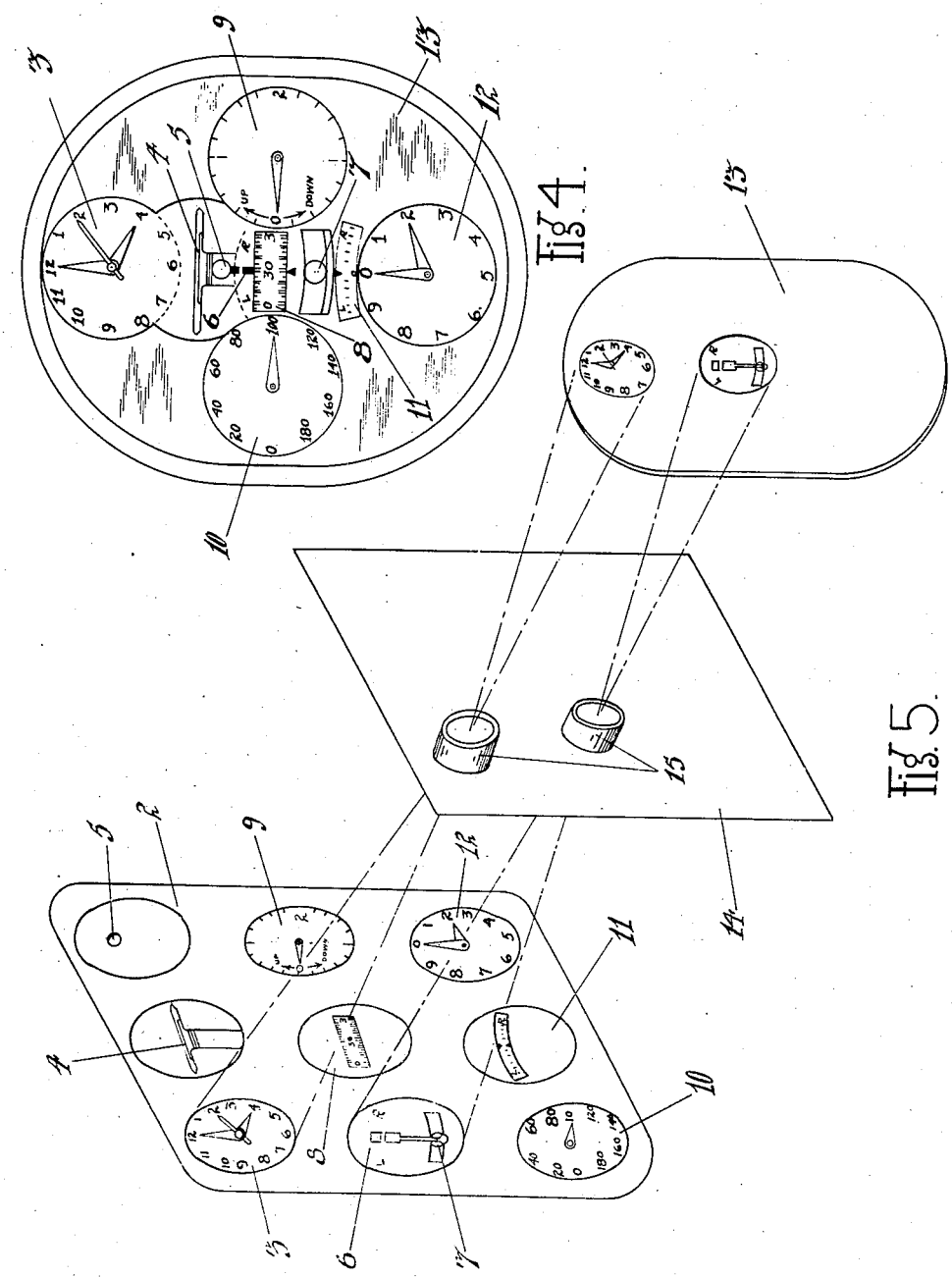
INVENTOR.
EDWIN A. LINK, JR.
BY
ATTORNEY.

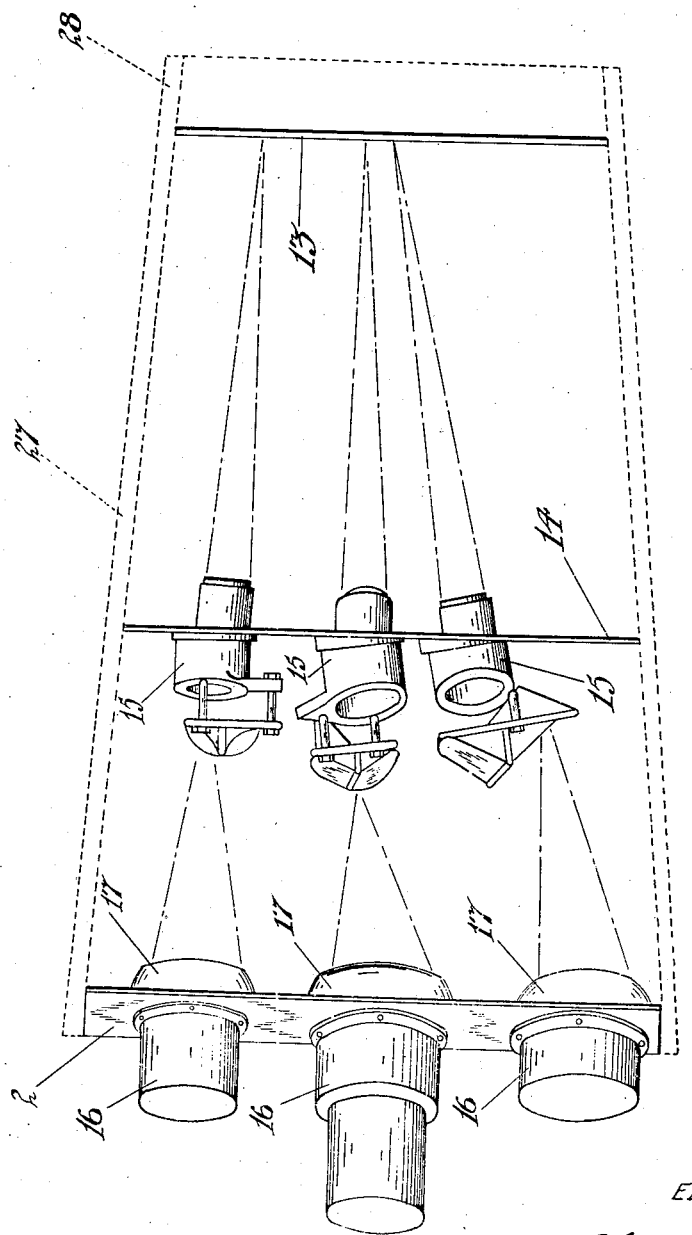

Nov. 7, 1939.  E. A. LINK, JR  2,178,637
MEANS AND METHOD OF INSTRUMENT INDICATION IN AIRPLANES, AND THE LIKE
Filed Aug. 3, 1935  5 Sheets-Sheet 5
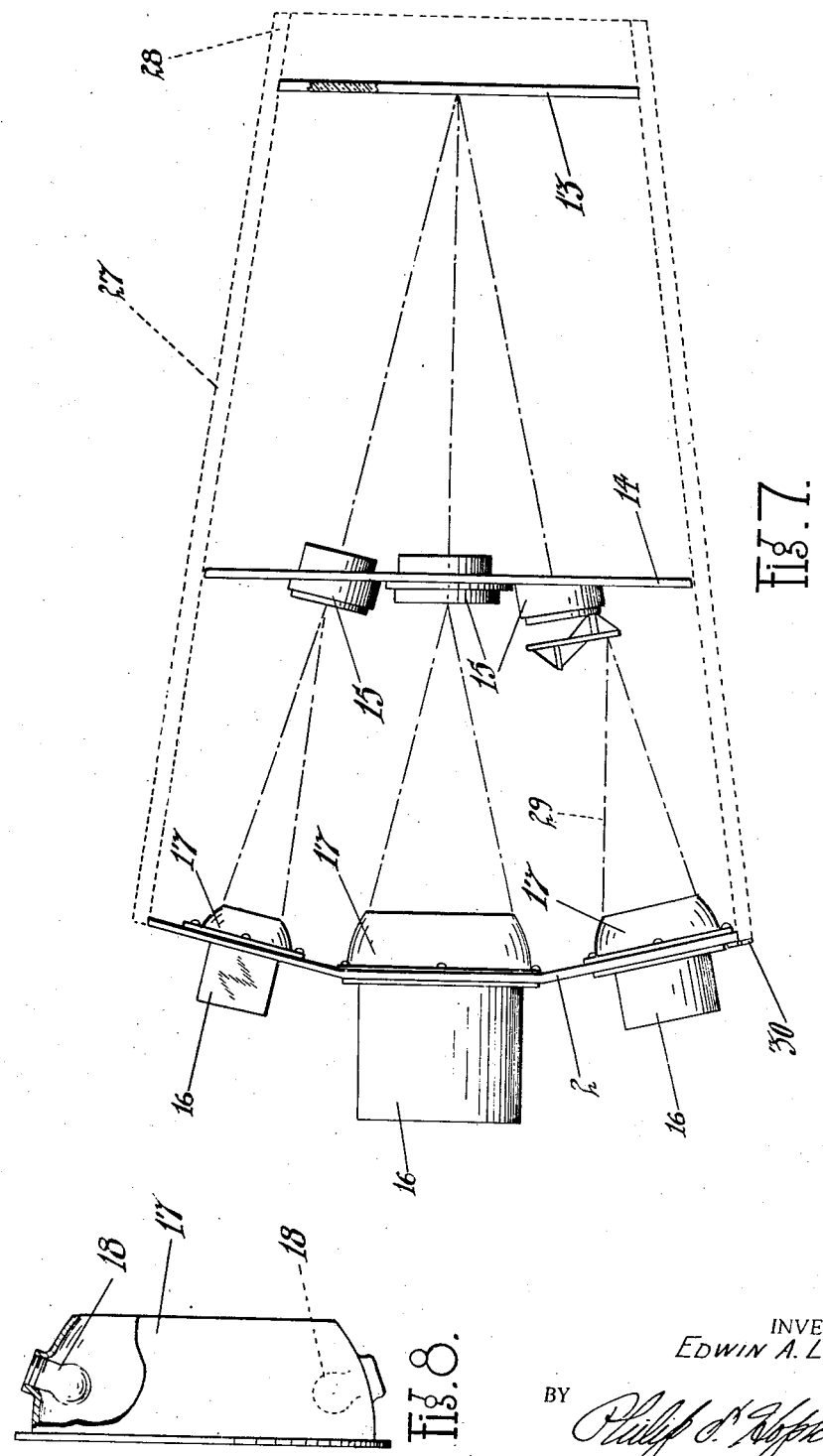
INVENTOR.
EDWIN A. LINK, JR.
BY
ATTORNEY.

Patented Nov. 7, 1939

2,178,637

UNITED STATES PATENT OFFICE 2,178,637

MEANS AND METHOD OF INSTRUMENT INDICATION IN AIRPLANES AND THE LIKE

Edwin A. Link, Jr., Binghamton, N. Y.

Application August 3, 1935, Serial No. 34,574

3 Claims. (Cl. 88—24)

My invention relates to a means and method of instrument indication in airplanes and the like and has for its primary object a means and method of communicating intelligence to a pilot in flight by instrument only, by means of which the pilot may safely land a plane or other air vehicle entirely blind.

With continued development of flying in both lighter than air and heavier than air vehicles, instruments have been perfected to aid the pilot in flight and to inform him of various conditions which he encounters. Recently instruments have been perfected of such sensitivity and accuracy that pilots have, with the aid of radio signals from the ground registering upon certain of such instruments, been able to land airplanes safely while completely hooded or shielded from sight of the ground and relying solely upon such instruments. Among these instruments of principal importance are included the directional giro, the radio compass, the artificial horizon, the radio marker beacon and the sensitive altimeter.

It will be understood, of course, that in addition to these instruments other instruments, older and well known, must be also used by the pilot in making blind landings, such as the turn and bank indicator, the air speed indicator, the vertical speed indicator, etc.

In performing the feat of landing an airplane blind, the pilot is an extremely busy individual observing the various instrument readings which tell him his distance above the ground, his distance from the landing field, his course to the landing field, his air speed and vertical speed as well as checking the time element and maintaining his plane on an even keel and in proper position for landing.

Heretofore in performing this operation the pilots have been handicapped severely by the fact that the many instruments which they must constantly and simultaneously observe in order to maintain proper position and to correct any errors therein, have of necessity been grouped at rather widely spaced points on the instrument board and without any particular semblance of order or co-relation with each other.

The nature of the instruments themselves is such that considerable space is required for each one, the faces of the instruments taking up considerable space and the mountings therefor generally requiring still greater space and consequent separation of the instruments. In many instances also, the effective or indicating portion of the instrument, such as a pointer and scale is only a small part of the instrument face or dial as provided but because of the size of the instrument mechanism and mounting, the same amount of space is required as in the case of an instrument having its entire face provided with indications.

The result is that with this arrangement and with the instruments considerably separated from each other on the instrument board and particularly without regard to co-relation with each other, it will be understood that the pilot in landing a plane blind is under a genuine handicap when it comes to simultaneously observing the instrument readings and maneuvering the plane in accordance therewith. Particularly is this true in the last few moments before the actual landing when the position of the plane must be exactly right and seconds count heavily if correction of position is required.

By way of further explanation, some of the instruments which are used in blind landings may be briefly described. There is, for instance, the sensitive altimeter, the face of which is a dial graduated around its edge and provided with two pointers, one of which describes the complete circle around the dial for each foot of descent or ascent and the other of which moves around the dial once only for each 100 feet of descent or ascent.

Then there is the vertical speed indicator which also has full dial face graduated and with a pointer movable up or down from a zero point to show whether the plane is climbing or descending.

Similarly there is an air speed indicator comprising a graduated dial with a single pointer movable over the graduations to indicate the forward speed of the plane through the air.

The time clock is familiar with its dial, minute and hour pointers and second hand.

The radio compass indicator requires only a portion of the dial and consists of a narrow window with central fixed pointers behind which rotates the sensitive graduated member responsive to direction.

Similarly the directional giro indicator comprises a narrow window with a fixed pointer and behind which moves the graduated indicating member.

A somewhat similar instrument is the bank indicator in that a narrow window is provided through which is observed the position of a ball to indicate the lateral position of the plane.

Sometimes more than one instrument indicator is combined in the same instrument casing such as the bank indicator just mentioned and the turn indicator comprising a pointer which moves to right and left of a central position to indicate right and left turns.

The artificial horizon indicator comprises a horizontally disposed pointer member adaptable to oscillate within the casing and cooperate with fixed indicators to show deviation from horizontal position.

The radio marker beacon indicator consists of nothing more than a small opening in the instrument dial through which a flashing light is visible as the plane passes over certain fixed ground points to indicate distance from the landing field.

All of these instruments are known and in use and form no part of my invention other than in the method and combination hereinafter described and claimed.

There are other instruments as well which are used in blind flying and landing and others undoubtedly will be developed to further increase the safety and efficiency of the pilot performing such flying operations. My invention contemplates and includes the use of any instruments which may be desired or necessary and without limitation to any particular instrument or group of instruments.

One very important object of my invention lies in the provision of a means and method by which the effective and necessary indicating portions only of the instrument faces are brought into the vision of the pilot in much closer relationship with each other than has heretofore been possible whereby the indicating elements of the large group of instruments required are condensed into a small space where all are easily simultaneously visible to the pilot.

Another equally important object of my invention is to provide a means and method of grouping the indicating elements of the various instruments together in co-relation with each other in such a manner that the indicating elements thereof all work on common vertical and horizontal planes. By this means the indicating pointers and other elements which move from a horizontal position up and down, such as for instance the air speed indicator, and the vertical speed indicator, are arranged in alignment so as to move across the same horizontal plane. Similarly the radio compass and directional giro are grouped so as to operate laterally together in a substantially common horizontal plane of vision. Likewise the time device and the altimeter having pointers movable around the dial faces, are aligned in vertical plane. In the same manner the directional giro and the bank and turn indicating elements are aligned within the vision of the pilot for operation together.

The effect of this grouping of the instrument indicating elements in co-relating fashion and so that similarly operating elements work together in substantially common planes and closely adjacent each other, greatly facilitates the reading of the instruments by the pilot and enables him to control his plane by correcting its position to maintain the indicating devices in proper relation to each other as a group rather than making it necessary for him to individually read each instrument.

Another important object of my invention lies in the provision of optical means whereby images of the effective or indicating portions of the various instruments used are projected to a screen within the easy vision of the pilot whereby such indicating means can be brought into a close compact group of indicators instead of the widely separated instruments themselves.

A further object lies in the means and method of re-locating the projected images of the indicating means so that regardless of the relative position of the instruments on the instrument board, the visual indications or images thereof are provided in whatever position and relation is desired on the screen before the pilot.

Another object lies in the provision of an optical system including illuminating means, lenses and prisms, by means of which the effective indicating portions of the instrument dials and faces are thus projected to the screen and in selected co-relation.

Other objects and advantages will be apparent as the description proceeds, reference now being had to the figures of the accompanying drawings forming a part of this application and wherein like reference numerals indicate like parts.

In the drawings:

Figure 3 is a plan view of a group of instruments as they may be mounted on the instrument board of an airplane.

Figure 4 is a plan view of the screen with the projected images of the instruments of Figure 3 thereon and illustrating the re-grouping and relocation thereof.

Figure 5 is a diagrammatic perspective view illustrating the method of projection and regrouping.

Figure 6 is a side view of the projection apparatus.

Figure 7 is a top plan view of the projection apparatus.

Figure 8 is a detail view illustrating the illuminating means for the instrument faces.

Figure 9 is an end view of one of the optical units used in the projection.

Figure 10 is a side view of the optical unit.

It should be understood clearly that my invention is not limited to use in airplanes, in connection with which it is illustrated and described but is equally applicable to dirigibles, and other vehicles as well. It should be also understood that the particular instruments herein shown and described have been selected for illustrative purposes only and that my invention is not limited to the use of any particular instruments or group of instruments. Obviously more or less instruments than those herein shown and described can be used with my invention with equal facility.

Figure 1:
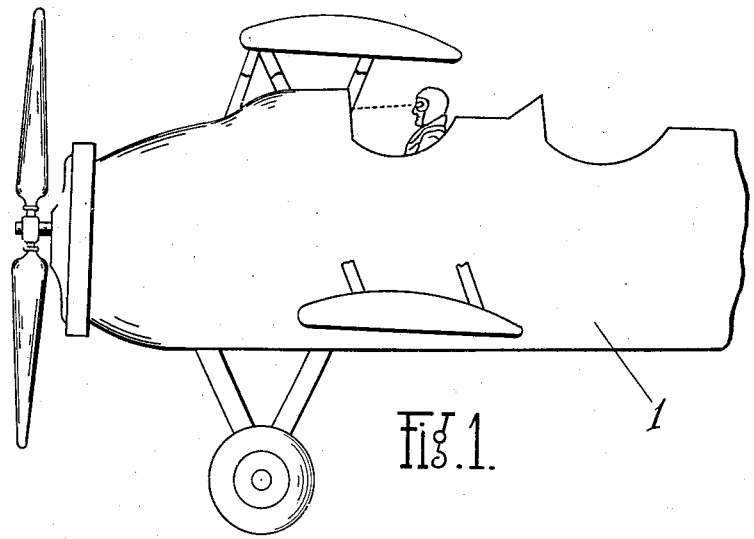
Figure 1 is a fragmentary side view of an airplane illustrating generally the position of my invention therein.
Figure 2:
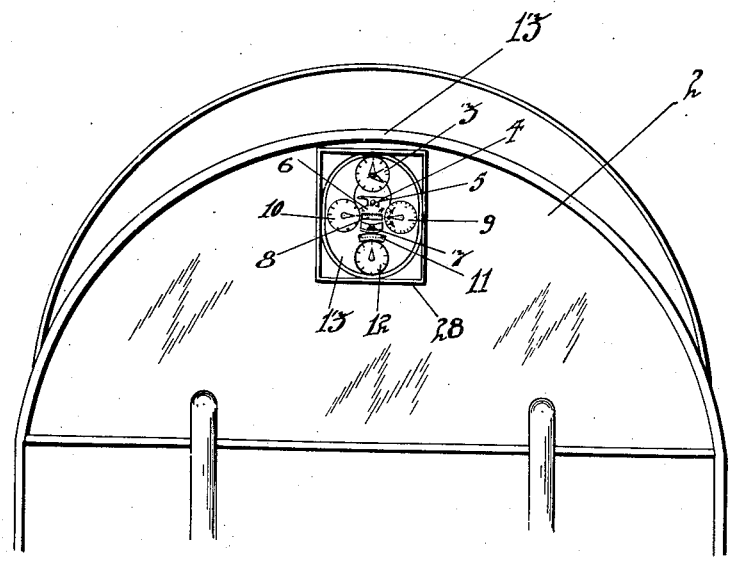
Figure 2 is a fragmentary diagrammatic view of the inside of the cockpit of an airplane illustrating the position of my invention therein.

With particular reference now to Figures 1, 2 and 3, the reference character 1 indicates generally an airplane such as may be equipped with my invention. The referenec character 2 indicates generally the instrument panel or board in the cockpit of an airplane and upon which are generally mounted all of the various instruments which are useful and necessary to the pilot in flight. Such instruments are generally of great number and variety and include in addition to those hereafter indicated in detail, tachometers, temperature gauges, and the like.

Included among the instruments are those which have previously been referred to and which are primarily essential for use in blind flying and particularly in making blind landings under such conditions as heavy fog, darkness, and the like. Preferably, such instruments are grouped together as much as the size and nature thereof permit on the instrument panel 2 and one such grouping is indicated in Figure 3 in which there is provided a clock 3, artificial horizon 4, radio marker beacon 5, turn indicator 6, bank indicator 7, directional giro 8, vertical speed indicator 9, air speed indicator 10, radio compass 11, and sensitive altimeter 12. The particular arrangement of these instruments, or others which may be included in the group, need not follow that shown in Figure 3 as this is an illustrative arrangement only.

Centrally disposed within the cockpit of the plane 1 is a projection screen 13 of any desired type, such as for instance, a ground glass, upon which the projected images of the instruments just mentioned are visible to the pilot in the plane. The screen 13 is preferably positioned exactly centrally of the cockpit and instrument panel where it is in the clear and easy line of vision from the pilot's seat and also from the co-pilot's seat alongside. The screen 13 is relatively small and does not interfere with the clear vision of other instruments which may be mounted on the panel. The screen 13 is also preferably positioned at a height which is substantially in alignment with the eyes of the pilot so that it comes within his ready vision without looking up or down and enables him to maintain a more or less fixed position of his head and eyes straight ahead and out of the plane so that a view outside of the plane, if available, is maintained without interference.

Referring now to Figures 6 and 7, it will be noted that the instrument panel 2, or that portion of it carrying the group of instruments, the images of which are to be projected to the screen 13, is substantially concave from side to side whereby the instruments mounted upon the various portions thereof are brought into more direct alignment with the relatively smaller screen 13 and with the optical devices to be described, located between the instruments and the screen.

Suitably disposed in front of the instrument panel 2 and in alignment with the group of instruments to be projected is a supporting bracket or plate 14 mounted upon which is a plurality of optical units indicated generally at 15, one for each of the indicating elements of the instruments 3 to 12 inclusive.

The mechanisms of the instruments themselves are generally mounted on the back of the instrument panel 2 and enclosed in suitable casings 16 and from which, of course, suitable connections run to the activating elements for the instruments whether such elements be air, electric current or radio antenna. With some of the instruments the entire mechanism is contained within its casing such as the clock, the bank and turn indicators, etc. The dials or faces of the instruments are generally mounted flush with the instrument panel 2 and mounted upon the panel 2 and surrounding each of the dials I have provided illuminating devices consisting of reflectors 17 within which are positioned electric lamp bulbs 18, preferably two in each reflector casing and each with a separate source of current to take care of emergency failure of one source. The lamps and reflectors are so arranged and designed that a maximum amount of illumination is provided for the indicating elements of the instrument faces. In the case of some instrument faces such as the radio marker beacon, the directional giro, and the radio compass, all of the face of the instrument may be blocked out with paint or a mask excepting only that particular portion having the indicating elements therein.

The optical instruments 15 are so mounted on the support 14 as to align with the faces of the instruments, as shown clearly in Figure 7. The illuminated portions of the instrument faces are thus picked up by these optical devices and the images projected to the screen 13 where such images are visible by the pilot on the opposite side of the screen. Obviously the arrangement of the optical units 15 is arbitrary and by means thereof the images of the instrument faces can readily be located in any desired position and relation on the screen 13. In addition the size of the images can be reduced or enlarged if desired in the projection, and of course, by projecting only the effective indicating elements of each instrument instead of the entire faces thereof, the group of images on the screen 13 is reduced in size materially from the actual size thereof on the instrument panel 2.

The optical units 15 consist essentially of a lens housing or casing 19 within which is housed a suitable projecting lens and carried by the housing 19 is a supporting bracket 20 to which is attached by the pins 21 a second supporting bracket 22. Secured in these brackets are reflecting prisms 23, 24 and 25.

For instance in the form of optical unit shown in Figures 9 and 10, the image of the particular instrument face with which this unit is aligned, is received by the prism 23 through the opening 26 in the bracket 22. The image is reflected to the prism 24, then to prism 25, and thence through the projecting lens and casing 19 to the screen 13.

The particular arrangement of prisms on the optical units 15 may vary to suit the required projecting function. In some instances, less than three prisms are necessary and in some instances, the projection may be made directly through the lens without the use of prisms. The purpose of the prisms is to reinvert the images so that they appear in proper position on the screen, and also with the pins 21, to permit the location on the support 14 of an adequate number of optical units for each of the indicating elements to be projected and to at the same time permit such units to pick up the desired illuminated image without interference with any of the other units.

If desired, an enclosing casing 27 may be provided between the instrument panel 2 and the screen 13 to prevent the entrance of extraneous light to the optical units and whereby clear and sharp images of the indicating elements are provided on the screen 13. This casing may extend beyond the screen 13 a short distance as at 28 to provide a hood therefor.

A comparison of Figures 3 and 4 shows clearly the re-location and re-grouping of the images of the instruments on the screen from the actual arrangement of the instruments on the panel. From this it will be noted that not only have the images of the instruments been brought closer together for easy simultaneous reading, but that only the effective portions of the instrument faces have been projected to the screen. It will likewise be observed that the various instruments have been so co-related in their screen images that instruments having similar directions of movement are located on substantially the same plane of vision and in vertical and horizontal alignments whereby the group of images may practically be read as a single instrument with the various co-related indicating elements moving together.

The same reference characters have been used to indicate the images of the instruments on the screen 13 as the instruments themselves.

In Figure 5 there is shown in diagrammatic perspective the means and method of projection.

It may be stated here that it is contemplated that if desired, individual light tight shields or tubes may be provided between each reflector 17 and its corresponding optical unit 15. Such arrangement is shown in dot and dash lines in Figure 7 and indicated at 29.

It is likewise contemplated that if desired the casing 27 within which is mounted the partition 14 and screen 13 may be hinged as at 30 to the instrument panel 2 whereby the same may be swung out of the way of the instruments and the instruments viewed directly.

Of course, changes may be made in details of arrangement and parts without departing from the spirit and scope of my invention. I do not limit myself, therefore, to the exact form herein shown and described other than by the appended claims.

I claim:

1. Indicating means for airplanes and the like comprising a plurality of separated indicating devices for indicating variable conditions, and means for projecting reflected images of said devices to a screen, the projected images being closer together than the devices themselves, and in different relation to each other than said devices.

2. Indicating means for airplanes and the like comprising a plurality of separated indicating devices, and means for projecting reflected images of said devices to a screen as a single, reduced co-related group, and in different relation to each other than said devices.

3. Indicating means for airplanes and the like comprising a plurality of separated indicating devices, and means for projecting reflected images of said devices to a screen as a single, reduced co-related group and in different relation to each other than said devices, the images of certain devices having common characteristics of indication being disposed in related vertical and horizontal planes.

EDWIN A. LINK, Jr.